United States Patent [19]

Ely et al.

[11] Patent Number: 4,765,902

[45] Date of Patent: Aug. 23, 1988

[54] PROCESS FOR IN SITU BIODEGRADATION OF HYDROCARBON CONTAMINATED SOIL

[75] Inventors: Douglas L. Ely, Novato; David A. Heffner, El Sobrante, both of Calif.

[73] Assignee: Chevron Research Company, San Francisco, Calif.

[21] Appl. No.: 101,358

[22] Filed: Sep. 25, 1987

[51] Int. Cl.4 ........................ C02F 3/34; D06M 16/00
[52] U.S. Cl. .................................... 210/610; 210/611; 210/747; 210/901; 405/128; 405/129; 166/246; 435/264
[58] Field of Search ............... 210/747, 610, 611, 170, 210/901, 620; 405/128, 129; 166/311, 246; 435/264

[56] References Cited

U.S. PATENT DOCUMENTS

| | | | |
|---|---|---|---|
| 3,846,290 | 11/1976 | Raymond | 166/246 |
| 4,288,174 | 9/1981 | Laws | 405/129 |
| 4,401,569 | 8/1983 | Jhaveri et al. | 210/610 |
| 4,469,176 | 9/1984 | Zison et al. | 405/129 |
| 4,670,148 | 6/1987 | Schneider | 210/747 |
| 4,713,343 | 12/1987 | Wilson, Jr. et al. | 210/620 |

*Primary Examiner*—Benoit Castel
*Attorney, Agent, or Firm*—S. R. La Paglia; T. G. De Jonghe; P. L. McGarrigle, Jr.

[57] ABSTRACT

The present invention is a process for in situ biodegradation of spilled hydrocarbons. The process involves drawing oxygen into a hydrocarbon contaminated zone. A borehole is drilled into the contaminated zone and gas is evacuated at high rates out of the borehole to thereby draw oxygen into the contaminated zone. Surprisingly, the carbon dioxide concentration in the evacuated gas remains high even at the high flow rates.

11 Claims, 2 Drawing Sheets

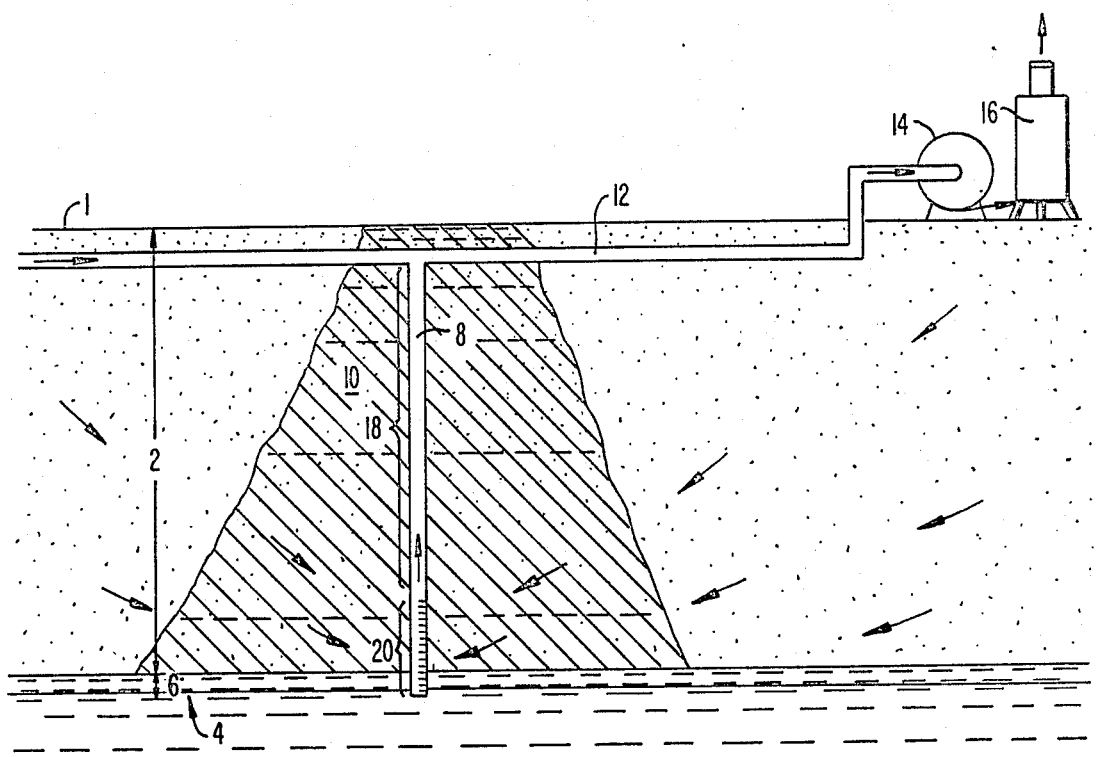
FIG._1.
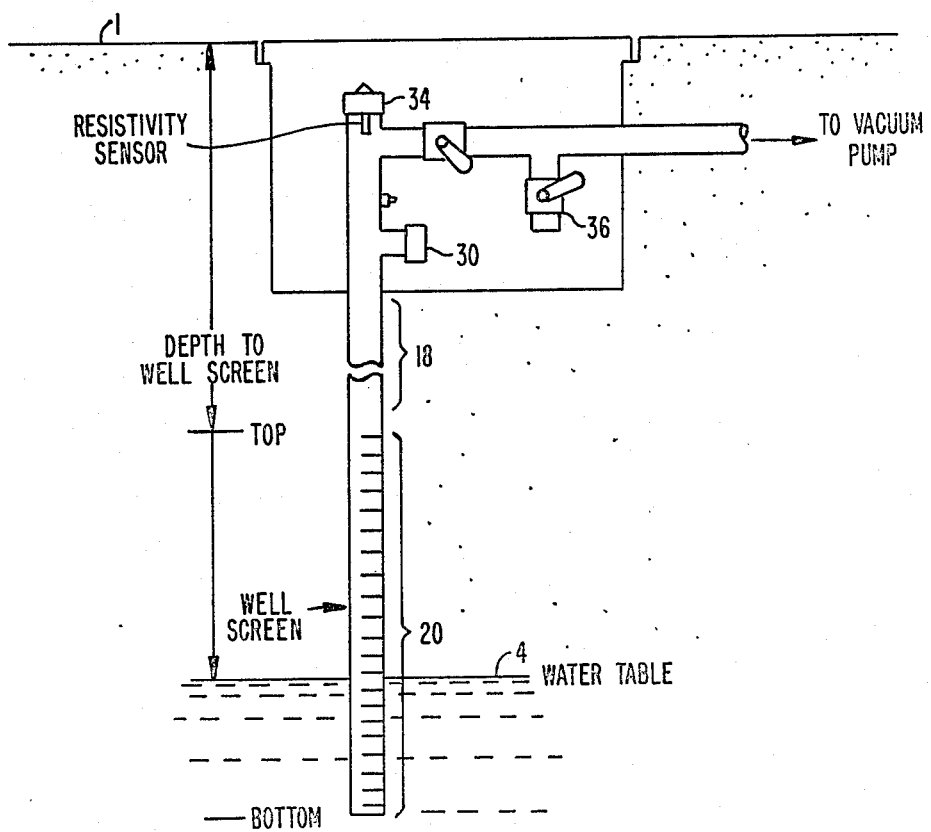
FIG._2.

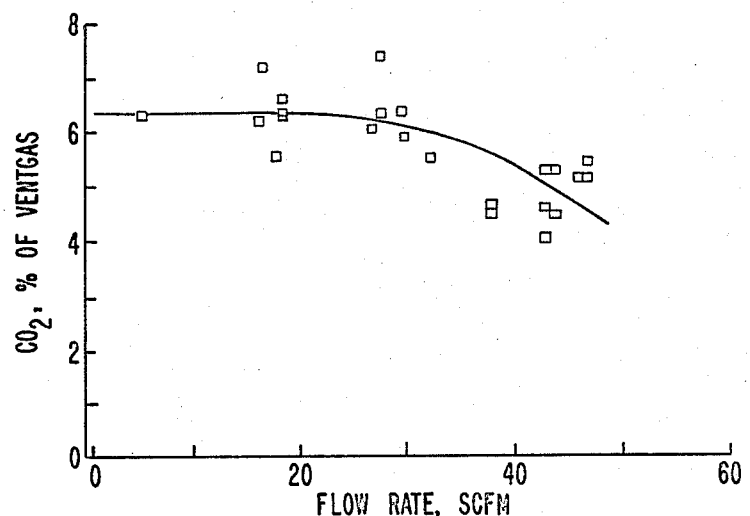
FIG._3.
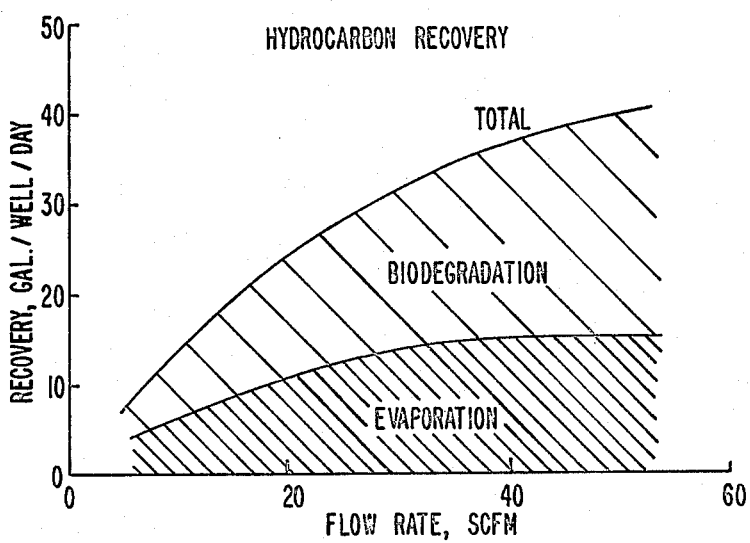
FIG._4.
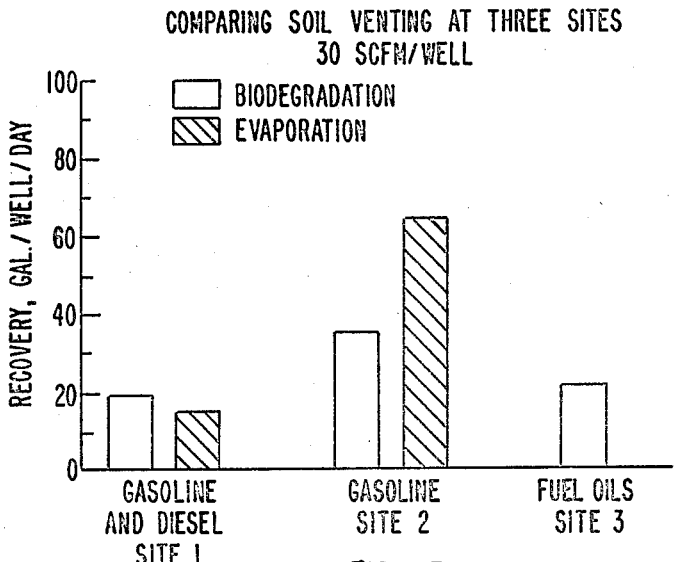
FIG._5.

4,765,902

PROCESS FOR IN SITU BIODEGRADATION OF HYDROCARBON CONTAMINATED SOIL

FIELD OF THE INVENTION

The present invention relates to a process for in situ biodegradation of hydrocarbon contaminated soil. More specifically, the present invention is a process for drawing oxygen into a contaminated zone to stimulate microbial biodegradation of hydrocarbons.

BACKGROUND OF THE INVENTION

Hydrocarbons may contaminate both soil and ground water as a result of accidental spillage from storage tanks or pipes; accidents with transport vehicles; or even by intentional acts such as dumping. Typically, some hydrocarbon biodegradation occurs in the first three feet below the earth's surface. However, that portion of the spill below three feet largely remains in the soil. If the hydrocarbons are not isolated or removed, the spill can spread beyond the original area.

Various procedures have been proposed to address soil and ground water contamination by spilled hydrocarbons. Some systems require physical containment or removal, while others treat the spilled hydrocarbon in place. When the hydrocarbons are treated in place they may be evaporated or biodegraded under specific conditions.

Underground evaporation of spilled hydrocarbons may be achieved by forced venting. See U.S. Pat. Nos. 4,593,760, issued June 10, 1986 to Visser et al; 4,183,407, issued Jan. 15, 1980 and 3,980,138, issued Sept. 14, 1976, both to Knopic. However, this process is limited by the vapor pressure of the spilled hydrocarbons and the amount that can be evaporated. Since there is a limit on the amount of hydrocarbon that can be evaporated by venting, there is no incentive to go above that flow rate that provides the maximum evaporation.

Biodegradation has also been disclosed for underground hydrocarbons. U.S. Pat. No. 4,401,569 issued Aug. 30, 1983 to Jhaveri et al discloses a method and apparatus for treating hydrocarbon contaminated ground and ground water. Patentees disclose adding nutrients and gases to water that is flowed through the contaminated soil. A process of this type can be disadvantageous because: the irrigation water washes some hydrocarbons or other contaminants (toxic metal salts, etc.) into the water table; water carries a limited amount of oxygen (8 ppm) into the soil which limits the amount and the rate of degradation that may take place; irrigation can limit biodegradation by physically channeling oxygen-carrying fluids away from the hydrocarbon contaminated (oily) dirt; and, water and oil are immiscible so that biodegradation is limited to water/oil surfaces.

Accordingly, there is the need for a process that will rapidly decontaminate hydrocarbon contaminated soil in an efficient and an environmentally acceptable manner. The need has now been satisfied by the invention that is described below.

SUMMARY OF THE INVENTION

According to the present invention, a process is provided for biodegrading hydrocarbons by drawing oxygen into a hydrocarbon contaminated zone. The process comprises establishing a borehole in a hydrocarbon contaminated zone having hydrocarbon degrading microbes; fluidly connecting a source of negative pressure to the borehole; evacuating gas out of the borehole to draw oxygen through the hydrocarbon contaminated zone; monitoring the evacuated gas; and adjusting the flow rate of oxygen into the hydrocarbon contaminated zone to above the flow rate for maximum hydrocarbon evaporation, whereby a substantial amount of hydrocarbons are biodegraded. More preferably, the flow rate of evacuated gas is between 30 and 250 standard cubic feet per minute (SCFM) per well, most preferably the flow rate is adjusted so that the amount of hydrocarbon biodegradation is within 50% of maximum.

Among other factors, the present invention is based on our finding that an unexpectedly effective process for in situ, underground hydrocarbon biodegradation is provided by drawing atmospheric oxygen into a contaminated zone at high flow rates. Surprisingly, the carbon dioxide concentration in the evacuated gas (as a measure of biodegradation) remains high even at the high flow rates. At the same time, the process is surprisingly advantageous because it also evacuates volatilized hydrocarbon vapor without the danger of detonation. The process is further advantageous over many prior processes because it rapidly biodegrades hydrocarbons in situ without: being limited by their vapor pressure; incurring additional expenses for nutrients, irrigation, etc.; being limited by the equilibrium limits imposed by dissolving $O_2$ and $CO_2$ into irrigation water; or dispersing of hydrocarbons and other contaminants either into the water table or beyond the spill area.

The present invention more specifically comprises establishing a borehole from the earth's surface through a hydrocarbon contaminated zone having hydrocarbon degrading microbes, which borehole terminates in the ground water; establishing a fluid impermeable lining, coaxially spaced and sealingly connected to the inside surface of the borehole, extending from the earth surface to the hydrocarbon-contaminated zone; establishing a fluid permeable lining, coaxially spaced within the inside of the borehole, fixedly connected to, and extending from, the end of the fluid impermeable lining; fluidly connecting a source of negative pressure to the fluid impermeable lining; evacuating gas from the fluid permeable section of the borehole to draw oxygen through the hydrocarbon-contaminated zone; monitoring the oxygen, total hydrocarbon, and carbon dioxide content of the evacuated gas; and adjusting the flow rate of oxygen into the hydrocarbon contaminated zone to achieve within 50% of the maximum hydrocarbon biodegradation and to maintain an oxygen and total hydrocarbon concentration outside the explosive range.

BRIEF DESCRIPTION OF THE DRAWINGS

FIG. 1 is a schematic diagram of an apparatus useful in the present process.

FIG. 2 is a schematic diagram of a well configuration useful in the present invention.

FIG. 3 is a graph showing the relationship between flow rate and $CO_2\%$ in the evacuated air for site 1.

FIG. 4 is a graph showing the total hydrocarbon recovery for site 1.

FIG. 5 is a graph comparing the biodegradation and evaporation for sites 1, 2, and 3.

DETAILED DESCRIPTION OF THE INVENTION

The present invention is useful for in situ biodegradation of hydrocarbon contaminated soil. The term hydrocarbon includes organic molecules that are commonly found in oil, such as aromatics, alkanes, olefins, various complex heterocyclic molecules, and various derivatives of these molecules, such as alcohols, esters, ketones, carbonates, acids, some halogenated compounds, complex heterogeneous hydrocarbon molecules, as well as the more specific decomposable compounds listed in Amdurer et al, Systems to Accelerate In Situ Stabilization of Waste Deposits, (Report No. EPA/540/2-86/002) which is hereby incorporated by reference in its entirety. However, the term hydrocarbon only includes those compounds which are biodegradable and which reach their maximum evaporation point before their maximum biodegradation point. These hydrocarbons typically have vapor pressures less than 2 psia at 25° C. Reference will now be made to FIG. 1 to provide an example of the present process.

A hydrocarbon contaminated zone 10 can be contained within a vadose zone 2. The vadose zone 2 is defined by the earth's surface 1 and the ground water level 4. There is also a capillary zone 6 just above the ground water level 4 where oil can be supported in soil capillaries on top of the water. It is contemplated that hydrocarbons are biodegraded when they are in the hydrocarbon contaminated zone 10, the capillary zone 6, or are washed into either two zones by the rise and fall of the ground water.

As shown in FIG. 1, a borehole 8 is established in the hydrocarbon contaminated zone 10. The borehole 8 essentially extends from the earth's surface 1 and provides vapor access to the contaminated zone 10. The borehole 8 can extend into the hydrocarbon contaminated zone 10, the capillary zone 6, or preferably further downward below the ground water level 4.

The borehole 8 preferably includes a fluid impermeable lining 18 and a fluid permeable lining 20. The fluid impermeable lining 18 is preferably positioned within the borehole 8, typically adjacent to the earth's surface 1. The fluid permeable lining 20 is also preferably positioned within the borehole 8, but in a position that ensures oxygen flow through the hydrocarbon contaminated zone 10. A gas exhaust line 12 is fluidly connected to the borehole 8 at the earth's surface 1 (which includes a submerged connection as shown in FIGS. 1 and 2) and then to a vacuum source 14 and a gas processing means 16. The vacuum source 14 creates negative pressure to draw oxygen into the hydrocarbon contaminated zone 10 along the flow lines shown by the arrows in FIG. 1. Starting from the vacuum source 14, the gas is evacuated in this sequence, through the: vapor carrying line 12; the fluid impermeable lining 18; the fluid permeable lining 20; the hydrocarbon contaminated zone 10; the vadose zone 2; and the earth's surface 1. Gas exhaust line 12 can be fluidly connected to a single borehole 8 or multiple boreholes (not shown).

The evacuated gas is preferably monitored for the flow rate, the oxygen concentration, the total hydrocarbon concentration, and the carbon dioxide concentration. Monitoring equipment for these purposes are known in the art. However, an example of a monitoring system is shown in FIG. 2. Flow rates can be measured by inserting a device such as an anemometer into a flow measurement port 30. Total hydrocarbon concentration can be measured by a system which includes a multimeter with a resistivity sensor, both of which can be attached to a well cap 34. A total organic analyzer (e.g., Model 401 manufactured by Byron Instruments) can also be used to determine the hydrocarbon and $CO_2$ concentrations. Oxygen and carbon dioxide concentrations can be measured by sampling the evacuated gas through sampling port 36 and passing the sample to an oxygen analyzer such as Model 320p-4 manufactured by Teledyne Analytical Instruments.

In the process of the present invention, the flow rate of the evacuated gas is adjusted to achieve the objective of a rapid and high amount of hydrocarbon biodegradation. Additionally, it is an objective to insure that the mixture of oxygen and hydrocarbon vapor in the evacuated gas is outside the explosive range. We have discovered that the first objective is achieved at surprisingly high flow rates and the second objective is achieved by adjusting the concentrations of oxygen and hydrocarbon vapors at these high flow rates. The flow rates (per borehole) in the process of the present invention are preferably above the flow rate for maximum evaporation of the hydrocarbon that is to be biodegraded, more preferably the flow rates are between 30 and 250 SCFM, most preferably at the flow rates are adjusted to achieve within 50% of the maximum hydrocarbon biodegradation.

Hydrocarbons can be removed by several mechanisms at these high flow rates. They are: evaporation; biodegradation; and by the creation of a hydrocarbon aerosol. Some hydrocarbons are removed by evaporation when gas is drawn out of the borehole 8 and oxygen is drawn through the hydrocarbon contaminated zone 10. For biodegradable hydrocarbons this evaporation typically increases as the flow rate increases, but will stop increasing at some flow rate. In hydrocarbon evaporation systems it is unnecessary and inefficient to increase the flow rate above this point because no more evaporation will result. For purposes of the present invention it is preferable to go beyond that level to reach high hydrocarbon biodegradation rates. Surprisingly, biodegradation occurs at the high flow rates beyond the point of maximum evaporation. Understandably, these high biodegradation rates increase as the flow rate increases, but stop increasing at some flow rate, depending on the hydrocarbon and the soil conditions (i.e., depth, permeability, etc.). The hydrocarbons can also be removed by the third mechanism; the creation of a hydrocarbon aerosol. These aerosols can form due to very high flow rates or a large pressure drop across the fluid permeable lining 20. Depending on the hydrocarbon and the particularities of the hydrocarbon contaminated zone 10, it may be desirable to increase the flow rates to remove hydrocarbons by this additional method.

It is preferable to achieve the maximum hydrocarbon biodegradation that is possible. For measurement purposes, hydrocarbon biodegradation is assumed to be equal to $CO_2$ removal because the hydrocarbons are converted to $CO_2$ (even though some hydrocarbons are initially incorporated into biomass). To calculate the maximum hydrocarbon biodegradation rate, the evacuated gas is monitored for $CO_2$ concentration. Then $CO_2$ removed per unit time is calculated from the flow rate and $CO_2$ concentration. Flow rate is increased until the total $CO_2$ removed no longer increases. At the flow rates of the present invention the $CO_2$ concentration in the evacuated gas is preferably between 1 and 14%, more preferably between 6 and 14%.

Also, the oxygen and total hydrocarbon concentrations are monitored and are adjusted to outside the explosive range. Preferably, the $O_2$ concentration is limited to below 10% to reduce the possibility of explosion when the total hydrocarbon vapor is above 1%. However, this oxygen limit may be exceeded if it is preferred to increase the flow rate. When the oxygen concentration is equal to or greater than 10%, diluent gas is preferably introduced into the evacuated gas to reduce the total hydrocarbon concentration to below the lower explosive limit.

The present invention is operable on virtually all varieties of biodegradable hydrocarbons within the boiling range of 90° to 1500° F. at atmospheric pressure. This includes: heavy oils, such as asphalt, gas oils, or fuel oils; and light oils, such as gasoline, jet fuel, diesel, turbine fuels, or light gas oils, as well as the compounds listed in Amdurer et al. The process is not limited by low hydrocarbon vapor pressures. Some biodegradable inorganics might also be biodegraded, such as sulfides, phosphorus, and nitrogen compounds.

Additionally, the process can be operable on a variety of soils. Examples are: sands; coral; fissured volcanic rock; carbonaceous deposits (i.e., limestone); gravel; silts; clays; and mixtures thereof. More densely packed soil can decrease the oxygen transport as well as the flow rate and can require closer well spacing when multiple wells are used. However, the present process will continue to be effective because oxygen will contact the microbes, either by convection or by diffusion, to stimulate hydrocarbon biodegradation.

The microbes that biodegrade hydrocarbons are typically bacteria. Many bacterial genuses adapt to this task and are known to those skilled in microbiology. Representative bacteria include gram-negative rods such as: Pseudomonas; Flavobacterium; Alcaliqenes; and Achromobacter; or gram-positive rods and cocci such as: Brevibacterium; Corynebacterium; Arthrobacter; Bacillus; and Micrococcus; and others such as Mycobacterium; Nocardia; and Streptomyces. These bacteria are preferably indigenous although they may be added to the hydrocarbon contaminated zone 10. Other hydrocarbon degrading microbes are fungi, algae, actinomycetes, etc. (see also Appendix A of Amdurer et al.).

The borehole 8 is another feature of the present invention. Preferably, the diameter of the borehole is between 8 and 40 inches, more preferably between 12 and 32 inches. Preferably, the borehole 8 extends into the hydrocarbon contaminated zone 10. In some instances it is preferable to extend the borehole 8 into the capillary zone 6 just above the ground water level 4 or even below the ground water level 4. Preferably, a lower depth ensures that air is drawn along the capillary zone irrespective of the fluctuations in the ground water level.

The borehole 8 can be drilled to absolute depths in excess of 150 feet. For a deeper borehole a higher flow rate is typically required for more biodegradation. The borehole 8 can be vertical, diagonal, or laterally oriented and can be drilled into the hydrocarbon contaminated zone 10 by any well drilling method known in the art that is suitable for penetrating the particular contaminated soil. Also, if it is preferable to laterally vent a contaminated zone, a trench may be excavated, a fluid permeable lining inserted into the trench, and then the soil back filled over the lining. However, care should be taken not to use a method that would reduce the permeability of the soil around the fluid permeable lining 20 of the borehole 8, i.e., by compaction or by using too much drilling muds or fluids.

Typically, the fluid impermeable lining 18 is coaxially spaced within the borehole 8. The lining 18 has an internal diameter between 2 and 16 inches., more preferably between 2 and 12 inches. This lining 18 may be well casing or a conduit which is smaller in diameter than the borehole 8. Preferably, a portion of the fluid impermeable lining 18 at the earth's surface 1 (or a minor depth below the surface) is sealed off and attached to the vacuum source 14. A fluid permeable lining 20 is coaxially positioned at the end of fluid impermeable lining 18. This lining 20 may be well casing having holes, screens, or other means to permit a gas, an aerosol, or liquid flow therethrough. Preferably, both linings 18 and 20 are substantially the same diameter. It is intended that both linings direct the vacuum induced air flow through the hydrocarbon contaminated zone 10. To achieve this goal, air infiltration between the lining 18 and the borehole 8 is preferably minimized. To prevent air from being drawn down from the earth's surface and along the lining 18, a low permeability material is preferably inserted between the lining 18 and the borehole 8. Preferably, this material is compacted soil, clay, grout, or cement.

Additionally, the pressure drop between the fluid permeable lining 20 and the borehole 8 can be adjusted. A higher pressure drop is preferable because high flow rates of this invention can form aerosols of hydrocarbons or contaminated water. The aerosol is carried out of the borehole with the evacuated gas thereby increasing contaminant removal. In this instance it is not necessary to provide a fill material for the lining 20. However, if a low pressure drop is preferred then the space defined by the borehole 8 and the outer diameter of the fluid permeable lining 20 can be packed with a loose fluid permeable material, such as gravel, sand, or crushed rock. This material prevents fine particles, such as silts, from plugging the fluid permeable lining 20.

The particular characteristics of the contaminated area may suggest that one or more boreholes be established to carry out the present process. Some relevant factors for this determination are: the amount of spilled hydrocarbon; the depth of the hydrocarbon contaminated zone 10; the type of soil; the ground water level 4, etc. If multiple boreholes are necessary, then they are preferably spaced between and 5 and 300 feet apart. Preferably, these boreholes are all vacuum wells although air inlet wells can be used for deeper hydrocarbon contaminated zones 10.

The vacuum source 14 evacuates gas through the fluid permeable lining 20 and passes this evacuated gas to the processing means 16. The vacuum source 14 may be any means capable of establishing negative pressure within the borehole to cause a flow of oxygen through the hydrocarbon contaminated zone 10. Preferably, the vacuum source 14 is a pump or an aspirator (see Knopic, U.S. Pat. No. 3,980,163). Preferable pumps are rotary and liquid ring pumps. Exemplary liquid ring pumps are manufactured by Sullair and Nash, and have a capacity to pull between 110 and 2500 SCFM. Preferably, these pumps have a capacity to pull at least 30 SCFM from at least one borehole, preferably multiple boreholes. Preferably, they have a means for flame suppression to prevent explosions. The processing means 16 may comprise a means to vent the evacuated gas to the atmosphere, a means for filtering the gas, a means for compressing the evacuated gas, or a means for incinerating the evacuated gas. The evacuated has contains: oxygen, carbon dioxide as a biodegradation product, water vapor, and hydrocarbon vapor due to evaporation. These components of the evacuated gas may be useful for a variety of purposes outside of the present invention. For example, the high amount of $CO_2$ that is produced by this process can be recovered and used in tertiary oil recovery or used as a refrigerant. The hydrocarbon vapor can be recovered and further refined or sold.

A variety of other factors contribute to the efficiency of the present invention. For example, the soil temperature, the soil humidity, the nutrients, and the pH are all variables that affect the growth of the microbial population. The soil temperature is difficult to regulate, but temperatures above 50° F. are preferable to promote microbiological growth. Additionally, humidity is preferable to foster growth. Water may be introduced into the air that is flowed through the hydrocarbon contaminated zone 10 by irrigation or steam injection, for example. Additionally, organic and inorganic nutrients are essential to microbial growth may be added to the hydrocarbon-contaminated zone 10 by means known in the art. These nutrients can be alkali metals (such as potassium), phosphates, and nitrates. Furthermore, pH may be manipulated by the addition of basic or acidic compounds if it is incompatible with microbial growth.

The present invention will be more fully understood by reference to the following examples. They are intended to be purely exemplary and are not intended to limit the scope of the invention in any way.

EXAMPLES

Tests were conducted on venting systems installed at three sites where various oil products had been spilled in soil and ground water. The systems had different depths to the top and bottom of the fluid permeable lining 20 (well screen) and each site involved different hydrocarbon contaminants as shown below:

| Site | Type of Oil | Depths to the Top and Bottom of the Well Screen |
| --- | --- | --- |
| 1 | 70% gasoline 30% diesel | 15 to 30 feet |
| 2 | gasoline blending component | 130 to 145 feet |
| 3 | heavy fuel oil | 10 to 90 feet |

The tests are described below in each of the examples. In each example no nutrients (fertilizers) or bacteria were added to the sites to stimulate biodegradation. Soil moisture was not increased by irrigation above normal levels.

EXAMPLE 1

Six test wells were drilled near 10 existing wells. Each borehole had an internal diameter of 4 inches and an outside diameter of 8 inches. PVC pipe was used as a fluid impermeable lining and a PVC screen was used as a fluid permeable lining. The soil was sandy loam. After evacuating and testing, gas from the borehole was subsequently incinerated.

The soil around the spill had been vented for about two years to control migration of oil vapors into nearby buildings. The venting rate for those two years was below 30 standard cubic feet per minute (SCFM) per well.

In the test the vented gas was kept below the lower flammability limit (1% oil vapor) by diluting it near the well head with air. An example of the undiluted vent gas had the following composition:

| Well Flow SCFM | $CO_2$ | $O_2$ | Oil Vapor | Methane |
| --- | --- | --- | --- | --- |
| 30 | 7.5% | 8.5% | 1% | 0% |

The atmospheric oxygen that was pulled into the ground stimulated significant biodegradation. There was enough biodegradation to deplete the oxygen concentration to below 10% and to make the vented gas non-flammable regardless of the oil vapor concentration. The lack of methane indicated insignificant anaerobic biodegradation.

The flow rate of the evacuated air was increased in steps and held constant for several days between each step, then samples of gas were analyzed for oil vapor and $CO_2$ concentration. The $CO_2$ levels remained nearly constant until the flow was increased above 30 SCFM, then it declined slowly as shown in FIG. 3. The $CO_2$ and $O_2$ concentrations were sustained throughout several months of tests which indicated that biodegradation was not temporary or limited by soil moisture or nutrients. The oil biodegradation rate was calculated by assuming that oil was converted directly into $CO_2$ (which is conservative since as much as half of the oil is initially converted to biomass). Total removal rate was the sum of the biodegradation and evaporation rates as shown in FIG. 4. FIG. 4 shows that biodegradation increases even after the evaporation rate has reached a plateau.

EXAMPLE 2

The carbon dioxide, oxygen, and total hydrocarbon concentrations were measured as in Example 1 and a well outside the spill area was monitored to determine the background levels for each of these components. These wells were drilled as in Example 1. At 30 SCFM the following data was generated for both wells:

| Site | Well Flow in SCFM | $CO_2$ | $O_2$ | Oil Vapor | Methane |
| --- | --- | --- | --- | --- | --- |
| Spill Area | 30 | 11% | 2.3% | 4.9% | 1.3% |
| Background (Non-Spill) | 30 | 1.0% | 18.3% | 0% | 0% |

The flow rate was increased to 180 SCFM which increased the biodegradation. At this flow rate, the gas velocity was high enough to create an aerosol of liquid gasoline and water droplets which indicated that the invention can be designed to also remove some liquids.

EXAMPLE 3

This example shows the biodegradation of heavy fuel oil.

At Site 3 the carbon dioxide, oxygen, and total hydrocarbon concentrations were monitored. The following data was collected:

| Well Flow In SCFM | $CO_2$ | $O_2$ | Heavy Fuel Oil Vapor | Methane |
| --- | --- | --- | --- | --- |
| 30 | 6.8% | 11% | 0% | 2.3% |

Evaporation of the heavy oil was negligible due to its low volatility. Venting at low flow rates would be ineffective in removing heavy, non-volatile oil spills. FIG. 5 compares the removal rates at Sites 1, 2 and 3. FIG. 5 shows that the process of present invention is useful to remove a broad range of hydrocarbon contaminants from soil and various depths. Furthermore, the oxygen and oil vapor concentrations can be controlled to safely operate outside of the explosive limits.

The foregoing disclosure has taught some specific examples of the present invention. However, there are many modifications and variations within the spirit of the disclosure. It is intended that the embodiments are only illustrative and not restrictive, reference being made to the following claims to indicate the scope of the invention.

What is claimed is:

1. A process for biodegrading hydrocarbons by drawing oxygen into a hydrocarbon contaminated zone, comprising:
   establishing a borehole from the earth's surface, through a hydrocarbon contaminated zone having hydrocarbon degrading microbes;
   establishing a fluid impermeable lining, coaxially spaced and sealingly connected to the inside surface of the borehole, extending from the earth surface to the hydrocarbon-contaminated zone;
   establishing a fluid permeable lining, coaxially spaced within the inside of the borehole, fixedly connected to, and extending from, the end of the fluid impermeable lining;
   fluidly connecting a source of negative pressure to the fluid impermeable lining;
   evacuating gas from the fluid permeable lining to draw oxygen into the hydrocarbon-contaminated zone;
   monitoring the oxygen, total hydrocarbon, and carbon dioxide content of the evacuated gas; and
   adjusting the flow rate of evacuated gas out of the borehole to between 30 and 250 SCFM per borehole so that a substantial amount of hydrocarbons are biodegraded.

2. A process in accordance ith claim 1 wherein the flow rate of evacuated gas is adjusted so that the amount of hydrocarbon biodegradation is within 50% of the maximum.

3. A process in accordance with claim 1 further comprising adjusting the oxygen and total hycarbon concentrations in the evacuated gas to outside the explosive range.

4. A process in accordance with claim 1 wherein the borehole extends into a capillary zone.

5. A process in accordance with claim 1 wherein the borehole extends into the ground water.

6. A process in accordance with claim 1 further comprising establishing multiple boreholes which are spaced between 5 and 300 feet apart from each other.

7. A process in accordance with claim 1 further comprising monitoring the water content of the evacuated gas 8. A process in accordance with claim 1 wherein the hydrocarbons that are biodegraded have a boiling point between 90 and 1500° F.

9. A process in accordance with claim 1 wherein the internal diameter of said fluid permeable and fluid impermeable linings is between 2 and 16 inches.

10. A process in accordance with claim 1 further comprising adding nutrients which promote bacterial growth to the hydrocarbon contaminated zone, selected from the group of phosphates, nitrates, or alkali metals.

11. A process in accordance with claim 1 further comprising removing hydrocarbons by creating an aerosol.

* * * * *